United States Patent
Minke et al.

(10) Patent No.: US 6,972,100 B2
(45) Date of Patent: Dec. 6, 2005

(54) METHOD AND SYSTEM FOR PROVIDING ARTICLES WITH RIGID FOAMED CEMENTITIOUS CORES

(75) Inventors: Ronald C. Minke, Leo-Cedarville, IN (US); David R. Redding, Fort Wayne, IN (US)

(73) Assignee: TT Technologies, Inc., Edgerton, OH (US)

( * ) Notice: Subject to any disclaimer, the term of this patent is extended or adjusted under 35 U.S.C. 154(b) by 54 days.

(21) Appl. No.: 10/426,922

(22) Filed: Apr. 29, 2003

(65) Prior Publication Data

US 2004/0007797 A1    Jan. 15, 2004

Related U.S. Application Data

(63) Continuation-in-part of application No. 10/131,056, filed on Apr. 24, 2002.

(51) Int. Cl.$^7$ ................................................ B28B 7/24
(52) U.S. Cl. ........................ 264/42; 264/46.5; 264/46.7; 425/4 R; 425/123; 425/127; 425/338; 425/447
(58) Field of Search ................................ 425/123, 261, 425/256, 447, 110, 127, 338; 264/42, 46.5, 264/46.7

(56) References Cited

U.S. PATENT DOCUMENTS

| | | | | |
|---|---|---|---|---|
| 1,875,644 | A | * | 9/1932 | Nelson ........................ 425/100 |
| 2,901,808 | A | * | 9/1959 | Muehleck et al. .......... 425/451 |
| 3,017,164 | A | * | 1/1962 | Ayers et al. .................. 366/11 |
| 3,220,692 | A | * | 11/1965 | Eklund ........................ 249/161 |
| 3,410,931 | A | * | 11/1968 | Johnson ..................... 264/46.5 |
| 3,628,766 | A | * | 12/1971 | Hartmann .................... 249/19 |
| 3,776,075 | A | * | 12/1973 | Matthews .................... 83/110 |
| 3,881,856 | A | * | 5/1975 | Fougea ....................... 425/432 |
| 3,987,600 | A | * | 10/1976 | Baehr ......................... 428/119 |
| 4,012,186 | A | * | 3/1977 | Ramazzotti et al. ........ 425/123 |
| 4,912,877 | A | | 4/1990 | Strydom |
| 4,921,033 | A | | 5/1990 | Finch et al. |
| 5,214,878 | A | | 6/1993 | Watt |
| 5,473,849 | A | | 12/1995 | Jones, Jr. et al. |
| 5,914,078 | A | * | 6/1999 | Morrison ................... 264/46.5 |
| 5,979,137 | A | | 11/1999 | Shoup |
| 6,003,461 | A | | 12/1999 | Blanchette et al. |
| 6,030,447 | A | | 2/2000 | Naji et al. |
| 6,092,343 | A | | 7/2000 | West et al. |
| 6,122,876 | A | | 9/2000 | Bado et al. |
| 6,138,430 | A | | 10/2000 | Van Acoleyen et al. |
| 6,164,951 | A | * | 12/2000 | Rao ............................ 425/449 |

(Continued)

FOREIGN PATENT DOCUMENTS

DE             2327455 A   * 12/1974      ........... F04B 15/02

(Continued)

OTHER PUBLICATIONS

Screenshot of website www.cellular-concrete.com/products, printed Sep. 5, 2001.

(Continued)

Primary Examiner—Robert B. Davis
(74) Attorney, Agent, or Firm—Brooks Kushman PC (57) ABSTRACT

One aspect of the present invention pertains to an apparatus for forming a rigid foamed cementitious core within a plurality of article shells. In general, the apparatus can be comprised of a shell bank for retaining a plurality of article shells and comprising a sled and a plurality of reinforcement shells, a filing station for delivering a gas-entrained cementitious material, and a pump. The gas-entrained cementitious material cures to form a rigid foamed cementitious core within each article shell in the plurality of article shells.

37 Claims, 6 Drawing Sheets

U.S. PATENT DOCUMENTS

| | | | |
|---|---|---|---|
| 6,187,409 | B1 | 2/2001 | Mathieu |
| 6,221,151 | B1 | 4/2001 | Campbell et al. |
| 6,311,454 | B1 | 11/2001 | Kempel |
| 6,346,146 | B1 | 2/2002 | Duselis et al. |
| 6,358,585 | B1 | 3/2002 | Wolff |
| 6,365,275 | B1 | 4/2002 | Wehje |
| 6,389,768 | B1 | 5/2002 | Gagne et al. |
| 6,406,078 | B1 | 6/2002 | Wycech |
| 6,550,216 | B1 | 4/2003 | Ohanesian |
| 2002/0046500 | A1 | 4/2002 | Hingston |

FOREIGN PATENT DOCUMENTS

| | | | | |
|---|---|---|---|---|
| GB | 1561271 A | * | 2/1980 | ........... C04B 17/00 |
| NL | 9301003 | | 1/1995 | |

OTHER PUBLICATIONS

Screenshot of website www.cellular-concrete.com/faq, printed Sep. 5, 2001.

Screenshot of website www.herculete.com, printed Sep. 5, 2001.

* cited by examiner

TO RETURN LINE   FROM HEATER LINE AND HEATER

Fig. 8

METHOD AND SYSTEM FOR PROVIDING ARTICLES WITH RIGID FOAMED CEMENTITIOUS CORES

CROSS-REFERENCE TO A RELATED APPLICATION

This application is a continuation-in-part of U.S. patent application Ser. No. 10/131,056, filed Apr. 24, 2002, entitled "High Performance Door", which is hereby incorporated by reference.

BACKGROUND OF THE INVENTION

1. Field of the Invention

One aspect of the present invention is generally directed to at least one method and system for providing articles with rigid foamed cementitious cores.

2. Background Art

Door systems have been designed to pass security tests, such as British standard PAS 23 (PAS 23), British standard PAS 24 (PAS 24), and Florida Building Code Test TAS/PA 201 (TAS/PA 201). These door systems are customarily designed to prevent forcible entry by tools as defined by PAS 23 and PAS 24 and to pass an impact test simulating large missile debris impact during high velocity wind storms, such as hurricanes or typhoons, as defined by TAS/PA 201.

Many steel doors pass some security tests. However, these doors are less desirable as entry way doors since they lack aesthetic detail, rust and dent readily. For example, entry way doors to common areas in apartment complexes and hotels experience significant use and receive substantial physical abuse, lending to significant rusting and denting. By way of another example, entry way doors along salt water coasts receive substantial physical abuse and are susceptible to corrosive chemical attack.

Other doors are particularly successful in resisting rust and denting. For example, fiberglass reinforced plastic (FRP) doors, glass reinforced plastic (GRP) doors, simple fiberglass doors, thermoplastic doors (such as PVC doors, poly-carbonate-skinned doors), and acrylic-capped acrylonitrile butadiene styrene (ABS) skinned doors commonly have this positive attribute. This success can be partially attributed to minimizing the effects of rusting and denting while offering an aesthetically pleasing appearance at a reasonable price.

However, these doors have had difficulty meeting the requirements of PAS 23 and PAS 24. For example, the plastic on these doors can be cut with tools, such as utility knives and wrecking bars. These doors have difficulty absorbing the impact of a nine pound 2"x4" piece of wood traveling at approximately 35 miles per hour, as required by TAS/PA 201. These results are unacceptable to certain customers, particularly public housing officials who control specifications for apartments in the United Kingdom and to building code officials in high velocity wind zone areas, such as Florida in the United States.

In light of the disadvantages inherent in the doors available in the market place, it would be desirable to provide a door that successfully passes PAS 23, PAS 24 and/or TAS/PA 201 tests. Moreover, it would be desirable to provide a door that resists denting and rusting and is reasonably priced through reduced material costs. Additionally, it would be desirable to provide a door that is a positive pressure fire rated door and/or retards sound transmission. It would also be desirable to provide an apparatus and system for manufacturing doors, and other articles with at least some of the above-mentioned attributes.

SUMMARY OF THE INVENTION

According to one aspect of the present invention, doors are provided that can be used as security doors that can pass PAS23, PAS24, and/or TAS/PA201 tests.

An aspect of the present invention provides doors that resist denting and are reasonably priced.

Another aspect of the present invention provides doors that are positive pressure rated doors.

Yet another aspect of the present invention provides doors that retard sound transmission.

According to another aspect of the present invention, an apparatus and system for manufacturing doors, and other articles, with at least some of the above-mentioned attributes is provided.

According to an embodiment of the present invention, an apparatus for forming a rigid foamed cementitious core within a plurality of article shells is disclosed. In certain embodiments, the apparatus comprises a shell bank for retaining a plurality of article shells, a filling station comprising a filling nozzle for delivering a gas-entrained cementitious material to the interior door cavity of each article shell, a pump for pumping the gas-entrained cementitious material through the filling nozzle and into the interior cavity of each door shell, and whereby the gas-entrained cementitious material cures to form a rigid foamed cementitious core within each door shell of the plurality of door shells.

In certain embodiments, each door shell and reinforcement shell can be placed on the shell bank such that two reinforcement shells are adjacent to each door shell. The shell bank can be comprised of a sled and a plurality of reinforcement shells having shell edges and shell surfaces. Each article shell can have a generally planar construction and a generally uniform thickness with marginal edges and first and second door skins helping to define an interior door cavity. The sled can have a sled surface sized to support at least one marginal edge of each article shell and at least one shell edge of each reinforcement shell.

In certain embodiments, the plurality of article shells are comprised of a plurality of door shells and the first and second article skins are comprised of first and second door skins. The marginal edges of each door shell can be comprised of a first and second rail edge and a first and second stile edge, each rail edge having a length less than each stile edge. Moreover, the sled can be sized to support the first rail edge and the second rail edge can be detached from the door shell during the delivery of a gas-entrained cementitious material to the interior door cavity of each door shell. Alternatively, the second rail edge can have a pour hole sized to retain a portion of the filling nozzle during delivery of the gas-entrained cementitious material. The first rail edge can also include a plurality of vent holes. The pump can be selected from the group consisting of a Moino pump and a disc pump.

In certain embodiments, the plurality of reinforcement shells include a first and second reinforcement shell end and at least two platen shells. The first and second reinforcement shell ends can be positioned on opposing ends of the sled. At least two platen shells can be placed between the first and second reinforcement shells and be spaced apart from each other and the first and second reinforcement shell ends to form at least two gaps for accommodating the generally uniform thickness of each door shell of the plurality of door shells. In certain embodiments, each thickness of the first and second reinforcement shell ends is greater than the thickness of each platen shell.

The sled can be comprised of a first and second sled panel. A plurality of casters can be attached to at least one edge of the sled for facilitating movement of the sled around the assembly floor.

In another embodiment, the filling station can further include a platform for aiding in the delivery of the gas-entrained cementitious material into the interior of each door shell.

In certain embodiments, each planar shell helps to define an interior platen cavity. The interior platen cavity can include a tube for conveying the heat exchanging liquid and can have a tube inlet for entering heat exchanging liquid and a tube outlet for exiting heat exchanging liquid. The heat exchanging liquid can be heated by a heater prior to the entering the tube inlet. The heat exchanging liquid can be water. The heat exchanging liquid exiting the tube outlet can be circulated through the heater.

Yet another embodiment of the present invention includes a method for forming a door with a rigid foamed cementitious core. The method comprises providing the apparatus as described above, loading the plurality of door shells onto the sled, delivering the gas-entrained cementitious material into each door in the plurality of door shells, at least partially hydration curing the gas-entrained cementitious material to provide a rigid foamed cementitious core within the interior door cavity, and unloading each door shell from the sled. Such method provides that the at least partially cured gas-entrained cementitious material provides a gas-entrained cementitious core for use in conjunction with a door. In certain embodiments, a web can be disposed within the interior door cavity of each door shell prior to the delivery step.

One embodiment of the present invention includes a system for forming a door with a rigid foamed cementitious core. The system comprises a plurality of apparatuses as described above, a platform for aiding in the delivery of the gas-entrained cementitious material into the interior of each article shell, a curing area for placement of the plurality of apparatuses after delivery of the gas-entrained cementitious material into the interior cavity of each article shell for at least partially curing the gas-entrained cementitious material to form a gas-entrained cementitious core. In certain embodiments, the system can include a vacuum source for aiding in the curing process. The article can be comprised of a door, the plurality of article shells can be comprised of a plurality of door shells, and the first and second article skins can be comprised of first and second door skins. In certain embodiments, a trim line for trimming each door shell after the forming of the gas-entrained cementitious core is provided. The system can further include a plurality of pallets for loading trimmed doors and curing area can be comprised of a curing room.

These and other aspects and embodiments of the present invention will become more apparent, clearly understood and appreciated from a reading of the specification in conjunction with the drawings.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings:

DETAILED DESCRIPTION OF EMBODIMENTS OF THE PRESENT INVENTION

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Aspects of the present invention will now be described in detail with reference being made to the accompanying drawings. According to the embodiment illustrated in FIG. 1A, door 10 is a hinged entry way door. It is understood that door 10 refers to, but is not limited to, hinged patio doors, sliding patio doors, hinged interior doors, impact-resistant doors suitable for meeting high wind velocity building codes, and general commercial grade doors. Door 10 can also be fitted with a translucent panel, i.e. a doorlite assembly or side light assembly. For example, an opening can be cut in door 10 to accept an inserted doorlite assembly. Alternatively, door 10 can be fitted with a frame assembly for accepting the translucent panel 12.

Figure 1A:
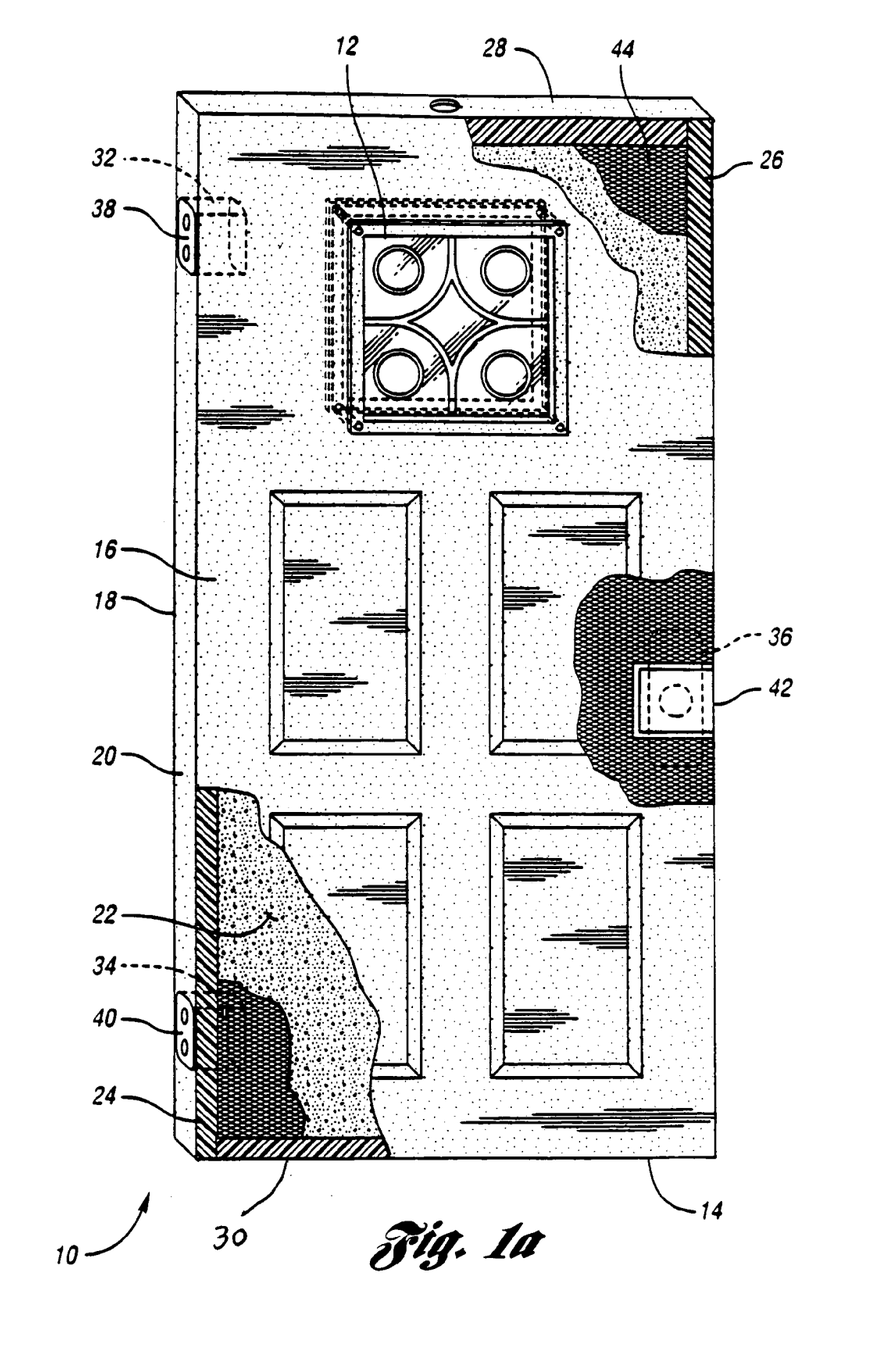
FIG. 1A is a front elevational view of a security door according to an embodiment of the present invention.

Door 10 can have many different sizes, shapes, and uses. In certain embodiments, door 10 can have a thickness of between about 0.5 inches and about 3 inches. In other embodiments, door 10 can have a thickness of between about 1.25 inches and about 1.85 inches. In certain embodiments, door 10 can have a height of between about 48 inches and about 96 inches. In other embodiments, door 10 can have a height of between about 74 inches and about 96 inches. In certain embodiments, door 10 can have a width of between about 8 inches and about 48 inches. In other embodiments, door 10 can have a width of between about 10 inches and about 44 inches. In yet other embodiments, door 10 can have a width of between about 30 inches and about 42 inches.

As shown in FIG. 1A, door shell 14 includes first door skin 16, second door skin 18 and door frame 20. It should be understood that one door skin can be an exterior door skin and the other door skin can be an interior door skin based on how the door is hinged to the entry way. In the illustrated embodiment, the exterior door skin typically faces an outside environment and the interior door skin faces an inside environment (i.e. the inside of a house containing the entry way for hinging the door). Door shell 14 helps to define interior door cavity 22. Door shell 14 can be comprised of a blow-molded material, for example, a pre-pigmented plastic, a thermoformed material or a twin-sheet thermoformed material. The door skins include an exterior side and an interior side. The interior sides face interior door cavity 22 and the exterior sides face away from interior door cavity 22. Suitable materials for the door skins include reinforced or unreinforced matrix materials of thermoset (i.e. thermoset materials), steel, aluminum, thermoplastic, ceramic, wood or combinations thereof, preferably thermoset materials, and most preferably fiberglass reinforced thermoset materials. In certain embodiments, the door frame is constructed with materials that are machinable with common building tools.

Door frame 20 includes a first stile 24 and a second stile 26. Stiles 24 and 26 are parallel to one another. Stiles 24 and 26 are positioned in a perpendicular relationship to first rail 28 and second rail 30. Second rail 30 is parallel to and spaced apart from first rail 28. First rail 28 and second rail 30 extend between and connect to stiles 24 and 26. Stiles 24 and 26 and rails 28 and 30 can be constructed of laminated or unlaminated wood. Stiles 24 and 26 can also be a hollow channel of pultruded or extruded reinforced plastic, a metal hollow channel, a partially or totally metal reinforced channel made of a material other than metal, or a compressed mineral stile. According to FIG. 1A, door frame 20 has a rectangular geometric configuration. However, it is understood that door frame 20 can be arranged in a variety of geometric configurations depending upon the desired application. For example, door frame can have a radiused or arched top typical of "mission style" architecture.

First hinge insert 32, second hinge insert 34 and lock insert 36 can be inserted into the door shell 14. Hinge inserts 32 and 34 can be fastened to second stile 26, adhered to either or both first door skin 16 or second door skin 20, or inserted into pre-defined spaces in either or both first door skin 16 or second door skin 18. Lock insert 36 can be fastened to first stile 24, adhered to either or both first door skin 16 or second door skin 18, or inserted into pre-defined spaces in both or either door skins 16 and/or 18. First hinge plate 38 and second hinge plate 40 can be secured to first hinge insert 32 and second hinge insert 34 by using a screw, nail, or similar fastener. Lock apparatus 42 can be secured to lock insert 38 by using a screw, nail or similar fastener.

Referring to FIG. 1A, web 44 can be disposed within interior door cavity 22. In certain embodiments, the material used for web 44 provides impact resistance and can prevent access to the interior door skin from the exterior side of the door skin by using, for example, sharp cutting tools. Portions of web 44 can be removed so that web 44 does not interfere with hinge inserts 32 and 34 and lock insert 36. Also, it should be understood that a plurality of layers of webs can be used for impact and intrusion resistance requirements.

Examples of web materials that provide impact resistance include, but are not limited to, plastic web materials, such as rubber-based plastics, soft durometer plastics, and polyolefin web materials. An example of a suitable soft durometer plastic can be a vinyl rubber mat. In certain embodiments, vinyl rubber mat sheets with a thickness of about 0.25 inches can be used. Suitable polyolefin web materials include those typically used as snow fences and/or construction barriers. In certain embodiments, these types of webs with a thickness of about 0.1 inches are used. It should be understood that web materials suitable for impact resistance need not be primarily planar sheets and can have significant thickness (in the range of about 0.01 inches to about 0.75 inches), for example dimensional monofilament materials such as COLORBOND available from BHP Steel of Australia.

Examples of web materials that are suitable for use and that also provide impact resistance and prevention of access to the interior door skin from the exterior door skin using, for example, sharp cutting tools include, but are not limited to, metal screen, polymer woven screen, expanded metal mesh, and wire form.

In other embodiments, a mat can be disposed within interior door cavity 22 and is generally rectangular in shape. It should be understood that a mat may or may not have openings. Examples of materials for mats, can include, but are not limited to, a plastic chamber with inflating gas, a ballistic resistant material, gypsum core, a solid metal mat, and a solid polymeric sheet. In certain embodiments, the mat can allow the foamed cement slurry to be poured on both sides of the mat.

Figure 1B:
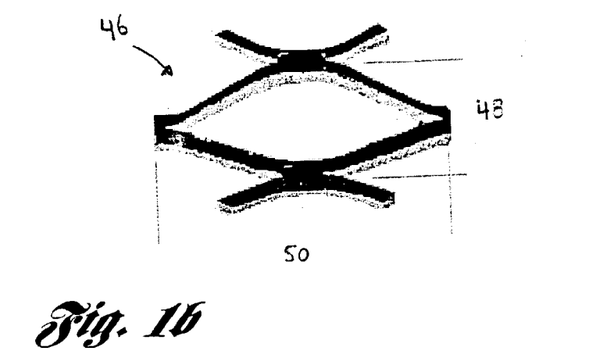
FIG. 1B depicts an exploded view of a portion of expanded metal mesh in accordance with an embodiment of the present invention.

FIG. 1B illustrates an exploded portion of expanded metal mesh in accordance with an embodiment of the present invention. The expanded metal mesh is preferably comprised of a network of apertures 46, i.e. openings, having a first dimension 48 and a second dimension 50. In certain embodiments, the ratio of the first dimension to the second dimension, otherwise referred to as the aspect ratio, can be greater than about 1.1. In other embodiments, the first dimension can be about 0.2 inches to about 1.5 inches and the second dimension can be about 0.18 inches to about 1.35 inches. However, it should be understood that the first and second dimensions can be greater than about 1.5 inches and about 1.35 inches, respectively, provided that the apertures are small enough to not allow penetration by a hand of an intruder and/or an impacting object through the expanded metal mesh. It should also be understood that the first and second dimensions can be less than about 0.2 inches and about 0.18 inches, respectively, provided that the apertures are large enough to allow a rigid foam to pass through the expanded metal mesh during pouring (this step is described in greater detail below).

In certain embodiments, the thickness of the expanded metal mesh can be about 0.3 inches to about 2.0 inches. In other embodiments, the thickness can be 0.04 inches. Suitable thicknesses can provide a relatively inexpensive web material while providing the advantages of impact resistance and entry prevention. In certain embodiments, web 44 is comprised of expanded metal mesh which can be disposed within interior door cavity 22 for maximum tensile strength by orienting the expanded metal mesh so that the first dimension is parallel to rails 28 and 30.

Figure 2:
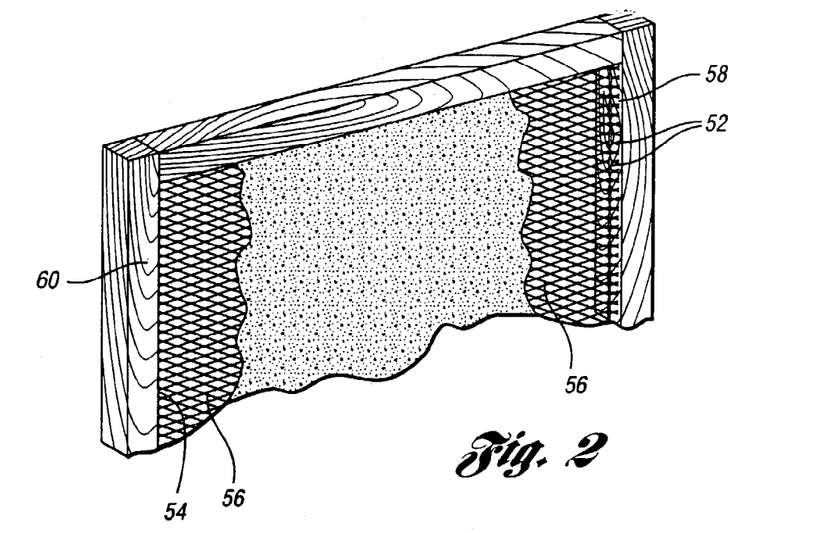
FIG. 2 depicts an exploded perspective view of a web connected to the interior stile surfaces of a security door according to an embodiment of the present invention.

FIG. 2 depicts an embodiment for disposing web 44 within interior door cavity 22. The lengthwise edges of web 44 can be bent to form first bent portion 52 and second bent portion 54. Bent portions 52 and 54 can have a uniform width of about 0.5 inches and about 1.0 inches. In certain embodiments, bent portions 52 and 54 can be substantially perpendicular to the adjoining flat portion 56 of web 44 and bent in the same direction so that they face each other. Bent portions 52 and 54 can be secured to at least a portion of first stile surface 58 and second stile In certain embodiments, flat portion 56 is closer to the exterior door skin than the interior door skin so that the added layer of protection (i.e. web 44) is closer to the exterior door skin which is vulnerable to attack.

Figure 3:
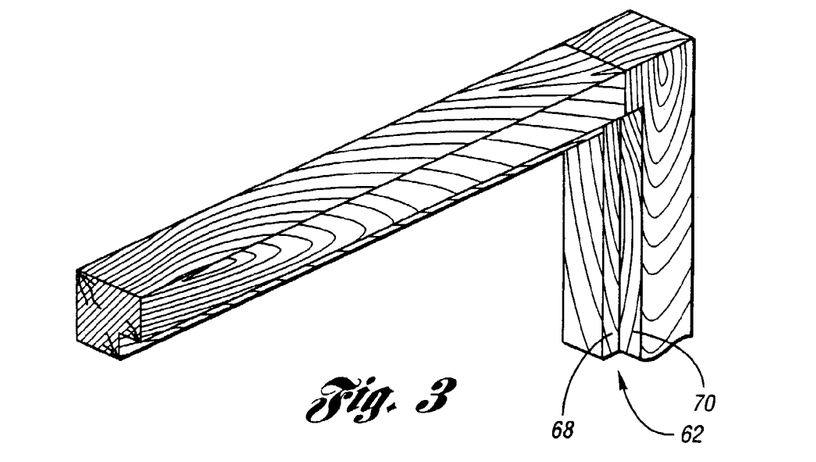
FIG. 3 depicts an exploded perspective view of a shelf machined into the frame edge of a security door according to another embodiment of the present invention.
Figure 4:
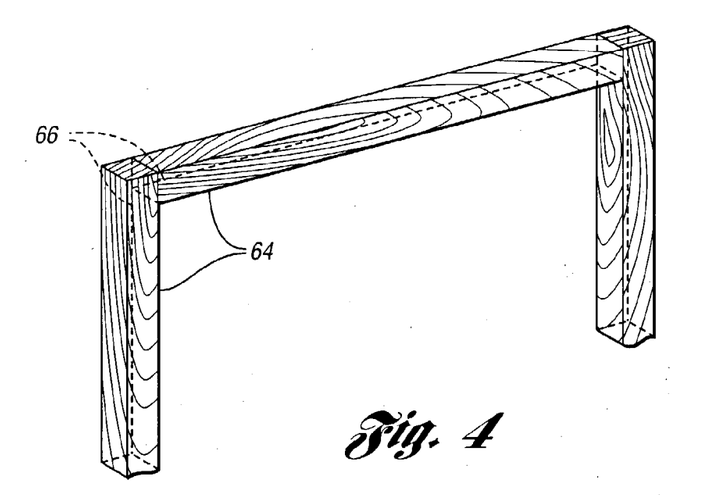
FIG. 4 depicts an exploded perspective view of frame edges suitable for the machining of a shelf.

FIGS. 3 and 4 depict another embodiment for disposing web 44 within interior door cavity 22. In the depicted embodiment, shelf 62 is machined, or otherwise formed, into all four sides of the frame edge. However, it should also be understood that shelf 62 may be machined into a portion the frame edge contained on stiles 24 or 26 or contained on rails 28 and 30. According to FIGS. 3 and 4, shelf 62 is machined into first frame edge 64 which is adjacent to first door skin 16 upon assembly of door 10. It should be understood that shelf 62 can also be machined into second frame edge 66 which is adjacent to second door skin 18 upon assembly of door 10.

Shelf 62 is comprised of first shelf surface 68 and second shelf surface 70. In certain embodiments, first shelf surface 68 is substantially parallel to door skins 16 and 18 and second shelf surface 70 is substantially perpendicular to door skins 16 and 18. In certain embodiments, the width of first shelf surface 68 can be at most about half the width of stiles 24 and 26. In certain embodiments, the width of second shelf surface 70 can be in the range of about the thickness of web 44 and about half the thickness of door 10.

In certain embodiments, the width of second shelf surface 70 is about the thickness of web 44 and shelf 62 is machined into the frame edge which is adjacent to the exterior door skin upon assembly. In certain embodiments, the door assembly provides the added layer of protection, i.e. web 44, adjacent to the exterior door skin which is vulnerable to attack.

In certain embodiments, the length and width of web 44 is greater than the length and width of interior door cavity such that the edges of web 44 lay flat upon first shelf surface 64 and can be secured to first shelf surface 68 with staples, brads, nails, screws or other fasteners.

According to another method of disposing web 44 within the interior door cavity 22, web 44 can be placed within interior door cavity 22 without being secured to door frame 20. According to this embodiment, web 44 is secured within interior door cavity 22 through the foaming process, described in more detail below.

In certain embodiments, door skins 16 and 18 are secured to door frame 20 after web 44 is secured to door frame 20. In these embodiments as well as others, door skins 16 and 18 are secured to door frame 20 with an adhesive. Suitable adhesives include, but are not limited to, latex acrylic, hot melt urethane, epoxy, pressure sensitive adhesives, and radiation cured adhesives. It is understood that door skins 16 and 18 can include interlocking edges that function to secure door skins 16 and 18 to door frame 20. Alternatively, an interlocking skin can be used instead of first door skin 16 and second door skin 18. The interlocking door skin fits over the door frame 18 and the edges of the interlocking door skin mate together, for example, with snap-fits.

In certain embodiments of the present invention, a rigid foam core disposed within the interior door cavity is then provided, as described in greater detail below. In certain embodiments, the rigid foam core prevents the passage of fire for at least about 20 minutes using test method ASTM or at least about 30 minutes using test method BSI 476/22. In other embodiments, the rigid foamed cementitious core prevents the passage of fire for at least 45 minutes using test method ASTM E2074-00 or at least about 60 minutes using test method BSI 476/22. In certain embodiments, the rigid foam core provides a sound transmission coefficient rating of at least about 27 using test method ASTM E-413. In certain embodiments, the rigid foam core can have a compressive strength of at least about 210 kPa (about 30 lbf/in$^2$). Examples of foams that provide rigid foam cores with the fire and sound ratings disclosed above include polyurethane foams having a minimum density of at least about 2.0 lb/ft$^3$ and those formed from gas-entrained cementitious materials. In certain embodiments, the gas-entrained cementitious material can be a controlled low strength cementitious material, or more specifically an air-modified controlled low strength cementitious material, or most specifically a foamed cement slurry.

Gas-entrained cementitious materials refer to inorganic materials or mixtures of inorganic materials which sets and develops strength by a chemical reaction with water by formation of hydrates, and which entrains more than about 5 volume % gas, preferably between about 10 and about 80 volume %, more preferably between about 30 and about 60 volume %, and most preferably between about 40 and about 55 volume %. It is understood that the gas can come from a variety of sources including, but not limited to direct gas injection, microspheres containing gases, porous particles containing gases, and in-situ chemical reactions or changes in the state of matter. It is further understood that materials entrained may not always be in the gaseous phase, particularly when environmental temperatures to which the article is exposed change significantly. It is further understood that the gases may migrate through time and be replaced by other gases or liquids.

Controlled low strength cementitious material (CLSM), a subset of gas-entrained cementitious materials, refers to a generic term for flowable cementitious materials having a self-compacting property and a compressive strength of less than about 1,200 lbf/in$^2$ (8.27 Mpa) and an unconfined ultimate compressive strength of between about 30 lbf/in$^2$ and about 500 lbf/in$^2$. In other embodiments, an unconfined compressive strength of between about 50 lbf/in$^2$ and about 250 lbf/in$^2$. CLSMs are also commonly referred to as flowable fill, flow fill, or controlled density fill.

Air-modified controlled low strength cementitious materials can be referred to as a CLSM which has entrained in it more than 5 volume % air. In certain embodiments, the entrainment can be between about 10 to about 80 volume % air. In other embodiments, the entrainment can be between about 30 to about 60 volume % air. In yet other embodiments, the entrainment can be about 40 to about 55 volume % air.

Foamed cement slurries can refer to a type of air-modified controlled low strength cementitious material in which the cementitious material is any type of hydraulic cement, and in some embodiments Portland cement, in which air or other gases are entrained at more than about 5 volume % air or other gas. In certain embodiments, the entrainment can be between about 10 to about 80 volume % air or other gas. In other embodiments, the entrainment can be between about 30 to about 60 volume % air or other gas. In yet other embodiments, the entrainment can be between about 40 to about 55 volume % air or other gas. Portland cement can be defined in ASTM C-150 and is a variety of blended hydraulic cement as defined in ASTM C-595.

Figure 5:
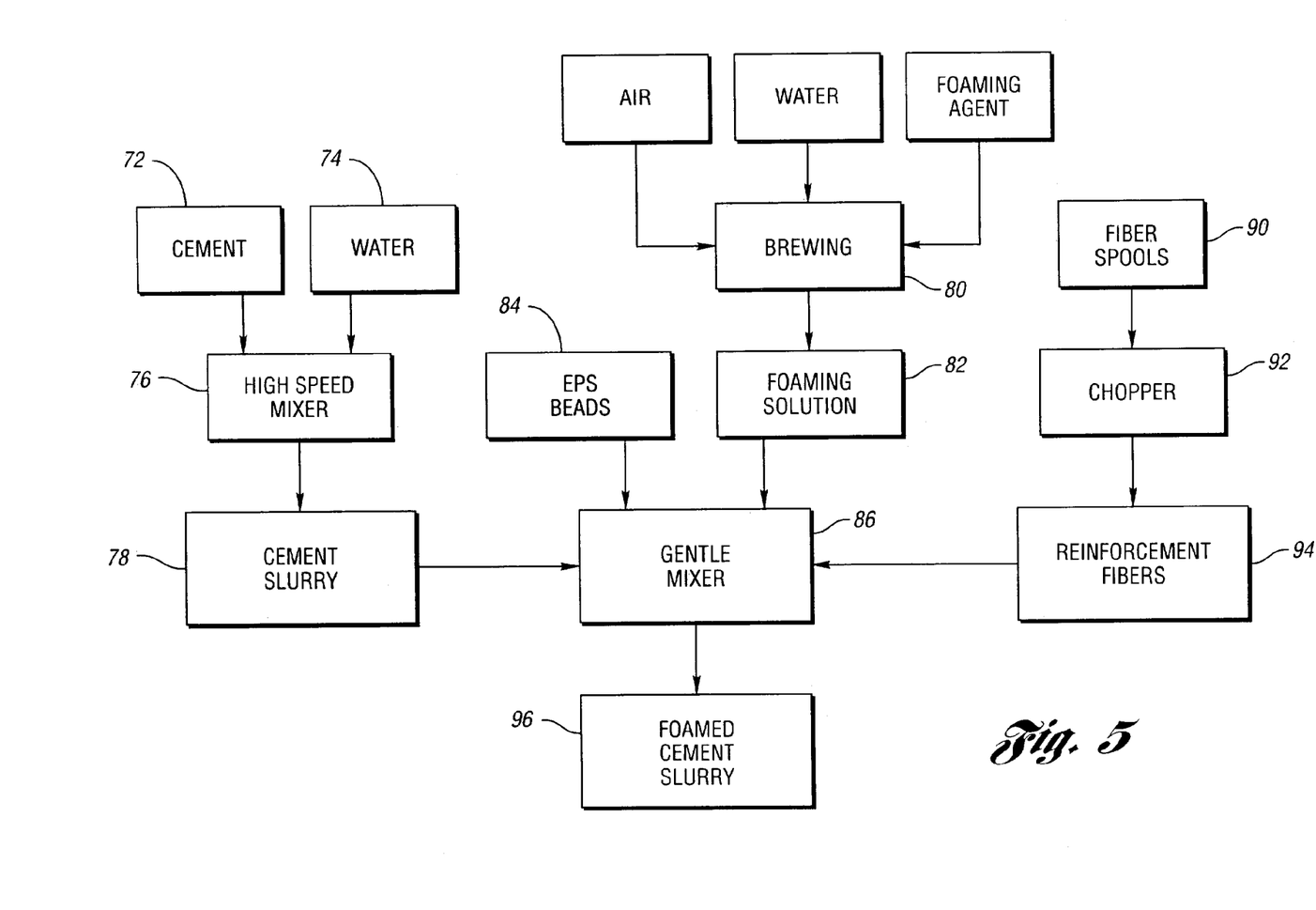
FIG. 5 depicts a flowchart of a preferred method for mixing ingredients to obtain a foamed cement slurry in accordance with an embodiment of the present invention.

In certain embodiments, foamed cement slurries can be utilized to produce gas-entrained cementitious cores by transferring the foamed cement slurry into the interior door cavity 22 and curing the slurries. It should be understood that the curing occurs through a hydration, otherwise referred to as a water-based reaction. The foamed cement slurry can be prepared by mixing a combination of ingredients. FIG. 5 depicts a flowchart of a method for mixing ingredients to obtain a foamed cement slurry in accordance with the present invention. According to FIG. 5, cement 72 and water 74 are mixed in a high speed mixer 76 to produce cement slurry 78. As depicted in block 80, a brewing step is utilized to produce foaming solution 82. Typically, the brewing step includes mixing air and water with a foaming agent to produce a foaming solution with entrained air. In one embodiment, cement slurry 78, foaming solution 82, and expanded polystyrene (EPS) beads 84 are introduced into gentle mixer 86 and mixed to produce foamed cement slurry 88. Optionally, fiber spools 90 can be fed into chopper 92 to produce reinforcement fibers 94, which can be introduced into gentle mixer 86 along with the other ingredients. Once mixed, the foamed cement slurry can be transferred into interior door cavity 22.

In certain embodiments, the water to cement ratio in the foamed cement slurry is greater than about 38 parts water to about 100 parts cement by weight in order to provide strength to the resulting door member. Optional additives, such as water reducers, setting accelerators, superplasticizers, reinforcement fibers, and expanded polystyrene beads, can be added to the foamed cement slurry to enhance properties, such as flow rate, curing rate, weight, or rigidity. It should be understood that reinforcing fibers refer to a fiber or a bundle of fibers having an aspect ratio greater than about 4, which results in one or more increased mechanical properties when present.

Water reducers, in general, improve the workability of cement slurries and reduce the amount of mixing water for a given workability. Typically this is about 5–15% reduction in water usage. Water reducers can be frequently drawn from the groups consisting of condensed naphthalene sulfonic acids, salts of lignosulfonic acids, salts of hydroxycarboxylic acids, carbohydrates and blends thereof. Superplasticizers, also known as superfluidizers, super water reducers, and high range water reducers, are a class of water reducers capable of reducing the water usage by at least about 30%. While not being bound to any one theory, it is believed that superplasticizers break down the large irregular agglomerates of cement particles by virtue of deflocculation due to adsorption and electrostatic repulsion, as well as some steric effects. Superplasticizers are typically drawn from a group consisting of sulfonated melamine-formaldehyde condensates, sulfonated naphthalene-formaldehyde condensates, modified lignosulfonates, sulfonic acid esters, polyacrylates, polystyrene sulfonates, and blends thereof.

Many cements that are suitable for use in the present invention contain additives. These additives can include cementitious and pozzolanic additives. Cementitious additives refer to an inorganic material or mixture of inorganic materials which forms or assists to form cementitious materials which develops strength by chemical reaction with water by formation of hydrates. Cementitious additives are generally rich in silica and alumina. According to ASTM C-539-94, pozzolanic additives refer to siliceous or alumino-siliceous material which in itself possesses little or no cementitious value, but which when in finely divided form and in the presence of moisture will chemically react with alkali and alkaline earth hydroxides at ordinary temperatures to form or assist in forming compounds possessing cementitious properties. Examples of pozzolanic additives can include Class C fly ash from burning lignite coal, Class F fly ash from burning bituminous coal, pulverized-fuel fly ash, condensed silica fume, metakaolin, rubber ash, and glass cullet. Additives found in cement are particularly useful in increasing the mass of the resulting door member.

Insulating gases can replace entrained air to provide greater insulation. These gases include molecules that generally have a higher atomic mass than air. Possible examples include halocarbons and hydrohalocarbons, such as HCFC-22, HFC-134a, HFC-245fa, HFC-365mfc; noble gases, such as argon, xenon, and krypton; sulfur hexafluoride; hydrocarbons, such as pentane; and mixtures thereof.

Figure 6:
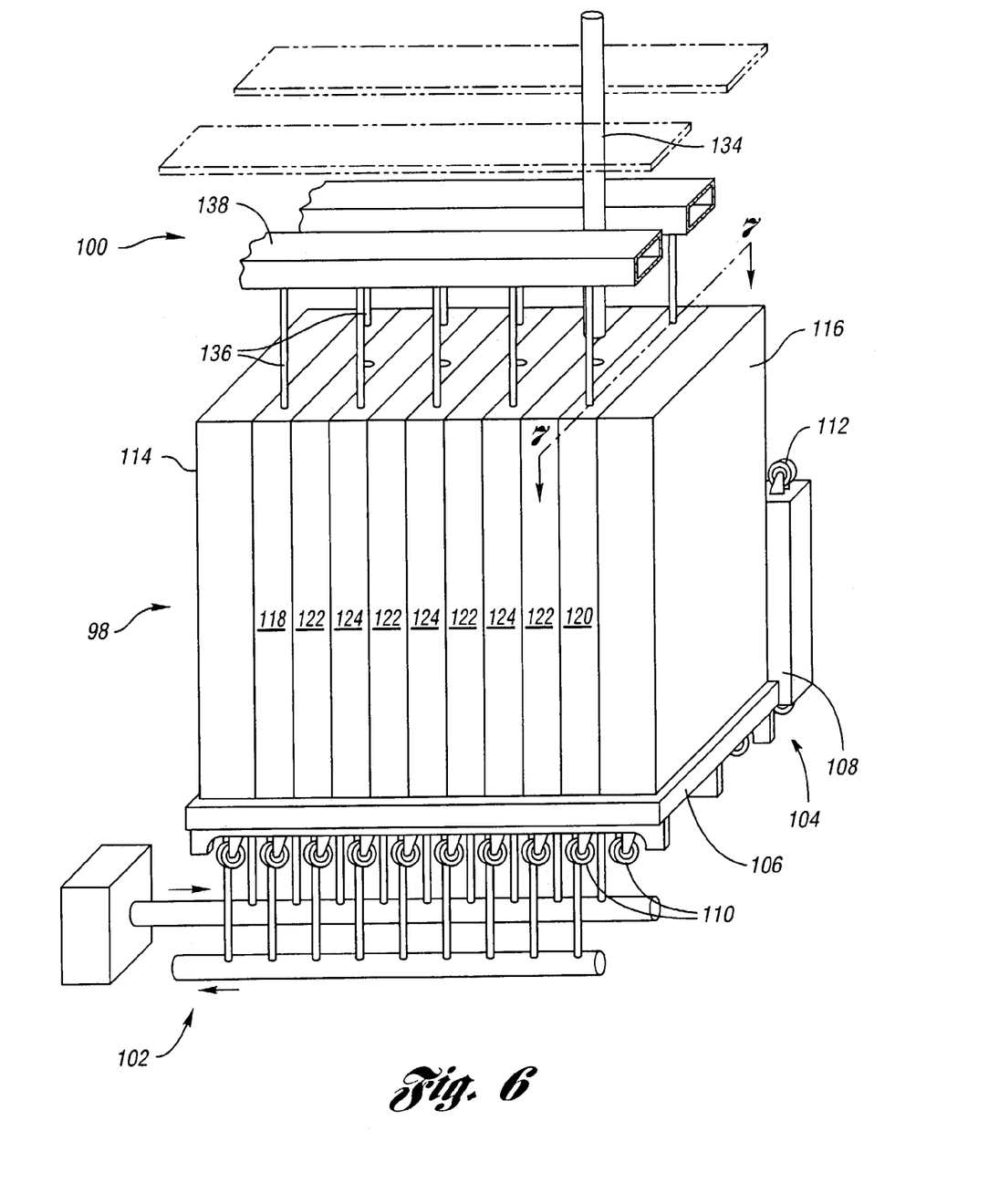
FIG. 6 illustrates an apparatus in accordance with an embodiment of the present invention for filling interior door cavities with foamed cement slurry and curing the foamed cement slurry to produce a gas-entrained cementitious core.

FIG. 6 depicts an apparatus in accordance with an embodiment of the present invention for filling interior door cavities with foamed cement slurry and curing the foamed cement slurry to produce a gas-entrained cementitious core. In the depicted embodiment, the filling structure is comprised of door shell bank 98, filling station 100, and heat exchanger system 102.

Door shell bank 98 is comprised of sled 104 having first and second sled panels 106 and 108. In certain embodiments, sled panels 106 and 108 can be generally rectangular in shape and constructed from plywood. The longer edges of generally rectangular sled panels 106 and 108 can be fitted with a first and second plurality of castors 110 and 112, respectively, for facilitating movement of sled 104 around an assembly floor.

In the depicted embodiment, door shell bank 98 is also comprised of first and second reinforcement shell ends 114 and 116, first and second platen shell 118 and 120, a plurality of door shells 122, and at least one platen center shell 124, which are loaded onto sled 104 in preparation for filling the plurality of door shells 122 with the foamed cement slurry. In alternative embodiments, reinforcement can be provided by a plurality of metal reinforcement sheets of substantial thickness (between about 0.5 inches to about 2.0 inches) placed between the door shells or by the door frame itself if made out of fabricated metal, for example, in the case of metal fire doors. In yet other embodiments, the reinforcement can be provided by a plurality of spaced apart and reinforced open mouth cavities such that each reinforced cavity is suitable for housing at least one article shell. In certain embodiments, the loading process is comprised of orienting sled 104 such that second sled panel 108 is substantially parallel to the assembly floor, sliding items 114 through 124 onto second sled panel 108 in an order, and then tipping sled 104 about ninety degrees so that first sled panel 106 is substantially parallel to the assembly floor. In certain embodiments, the order from one end to the other end of sled 104 can be the following: first reinforcement shell end 114, first platen shell 118, door shell 120, platen center shell 124, door shell 120, second platen shell 122, and second reinforcement shell end 116. It is fully contemplated that greater than two door shells can be loaded onto sled 104 as long as additional platen center shells 124 are loaded in between the door shells. In certain embodiments, 10–15 door shells with 11–16 platen center shells 124 are loaded onto sled 104. However, it should be understood that this is merely exemplary of the amount doors that can be paired in tandem with platen center shells. Other amounts can be used based on the amount of time necessary to set the foamed cement slurry. First rail of each door shell 120 faces upward from an assembly floor and second rail of each door shell 120 preferably sits flush against first sled panel 106 after sled 104 can be tipped about ninety degrees.

In certain embodiments, reinforcement shell ends 114 and 116 are generally rectangular in shape with a height and length similar to door shell 122 and can be comprised of a metal alloy sheet of substantially uniform thickness which is fabricated into a one-piece, hollow rectangular box with strength sufficient to resist buckling under vacuum conditions. Suitable pure metal or metal alloys for this purpose, include, but are not limited to, aluminum, stainless steel, carbon steel, cast iron, and alloys thereof. In certain embodiments, the width of reinforcement shell ends 114 and 116 can be in the range of about 0.05 inches to about 4.0 inches. In other embodiments, the width can be in the range of about 0.625 inches to about 1.0 inches. In certain embodiments, the width can be in the range of about 0.625 inches to about 0.75 inches.

In certain embodiments, platen shells 118, 120, and 124 can be generally rectangular, with a height and length similar to door shell 122. Such platens can be comprised of a metal sheet of substantially uniform thickness which is fabricated into a one-piece, hollow rectangular box with strength sufficient to resist bucking under vacuum conditions. Suitable pure metal or metal alloys for this purpose, include, but are not limited to, aluminum, stainless steel, carbon steel, cast iron, and alloys thereof. In certain embodiments, the width of reinforcement shell ends 114 and 116 can be in the range of about 0.05 inches to about 4.0 inches. In other embodiments, the width can be in the range of about 0.625 inches to about 1.0 inches. In certain embodiments, the width can be in the range of about 0.625 inches to about 0.75 inches.

In certain embodiments, platen shells 118, 120, and 124 can provide heat to the foamed cement slurry encased in the surrounding door shells in order to decrease the green-strength curing time, as described in greater detail below. The heat decreases the time necessary for the cement in the foamed cement slurry to form a structurally stable cell wall around entrained gas and/or air bubbles. In certain embodiments, the interior cavity of platens 118, 120, and 124 house a tube generally following a serpentine path for conveying a heat exchanging liquid. It is fully understood that the other path configurations can be used as long as they can be used to deliver heat to a substantial portion of the platen surface.

Figure 7:
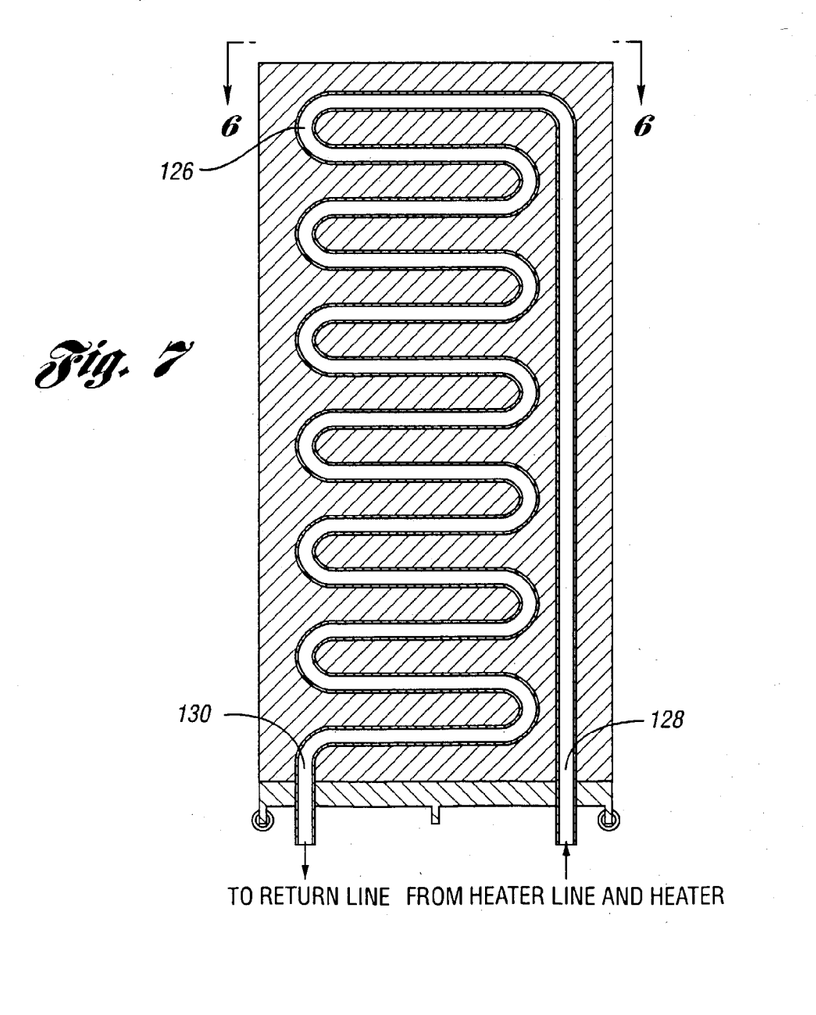
FIG. 7 depicts a cross-section of a platen which includes a tube for conveying a heat exchanging liquid in accordance with an embodiment of the present invention.

For example, FIG. 7 depicts a cross-section of platen 118 about plane 7-7 which includes tube 126 for conveying a heat exchanging liquid. In the depicted embodiment, tube 126 enters the interior shell cavity of platen shell 118 through opening 128, extends through a generally serpentine path and exits through opening 130. In certain embodiments, the heat exchanging liquid can be introduced into a heater for heating the liquid to a temperature in the range of about 1° C. to about 70° C. above ambient, more particularly about 10° C. to about 40° C., and most particularly about 20° C. to about 35° C. In certain embodiments, the heat exchanging liquid can enter the interior cavity of the platen in tube 126 through opening 128. As the heat exchanging liquid flows through tube 126 towards opening 130, it loses heat to the relatively cooler adjacent liquid cement slurry. This heat exchange aids in decreasing the green strength curing time. The cooled heat exchanging liquid exits the interior door cavity in tube 126 through opening 130 which feeds into a return line. Preferably, the heat exchanging liquid is circulated for further use. Examples of suitable heat exchanging liquids include, but are not limited to, water, oil, or THERMOL. In certain embodiments, the return line is connected to the heater through a recirculating line for recycling the heat exchanging liquid to provide energy savings.

According to the embodiment as shown in FIG. 6, filling station 132 is comprised of filling nozzle 134, vacuum lines 136, and platform 138. Nozzle 134 can deliver foamed cement slurry into interior door cavity 22. The foamed cement slurry can be transferred into interior door cavity incrementally, using between one and five increments. In certain embodiments, one to three increments can be used. In other embodiments, one increment can be used. In certain embodiments, nozzle 134 can be part of a gravity feed system for transferring foamed cement slurry from gentle mixer 86 into interior door cavity 22. In these embodiments, the contents of gentle mixer 86 can be poured under the force of gravity into a hopper. The hopper can be mechanically positioned over interior door cavity 22 and foamed cement slurry flow via a pump from the hopper through nozzle 134 into interior door cavity 22. This system can reduce costs by limiting the destruction of bubbles passing through the compressive phase of the pump. In certain embodiments, platform 138 is positioned over loaded door steel bank 98 and is in the vicinity of filling nozzle 134 such that an operator can move the filling nozzle between door shells. In certain embodiments, at least one vacuum line 136 can be attached to a shell edge of at least one platen shell 118 for providing suction between the door skin and a reinforcement shell surface so that the door shell retains its pre-curing shape during curing.

Figure 8:
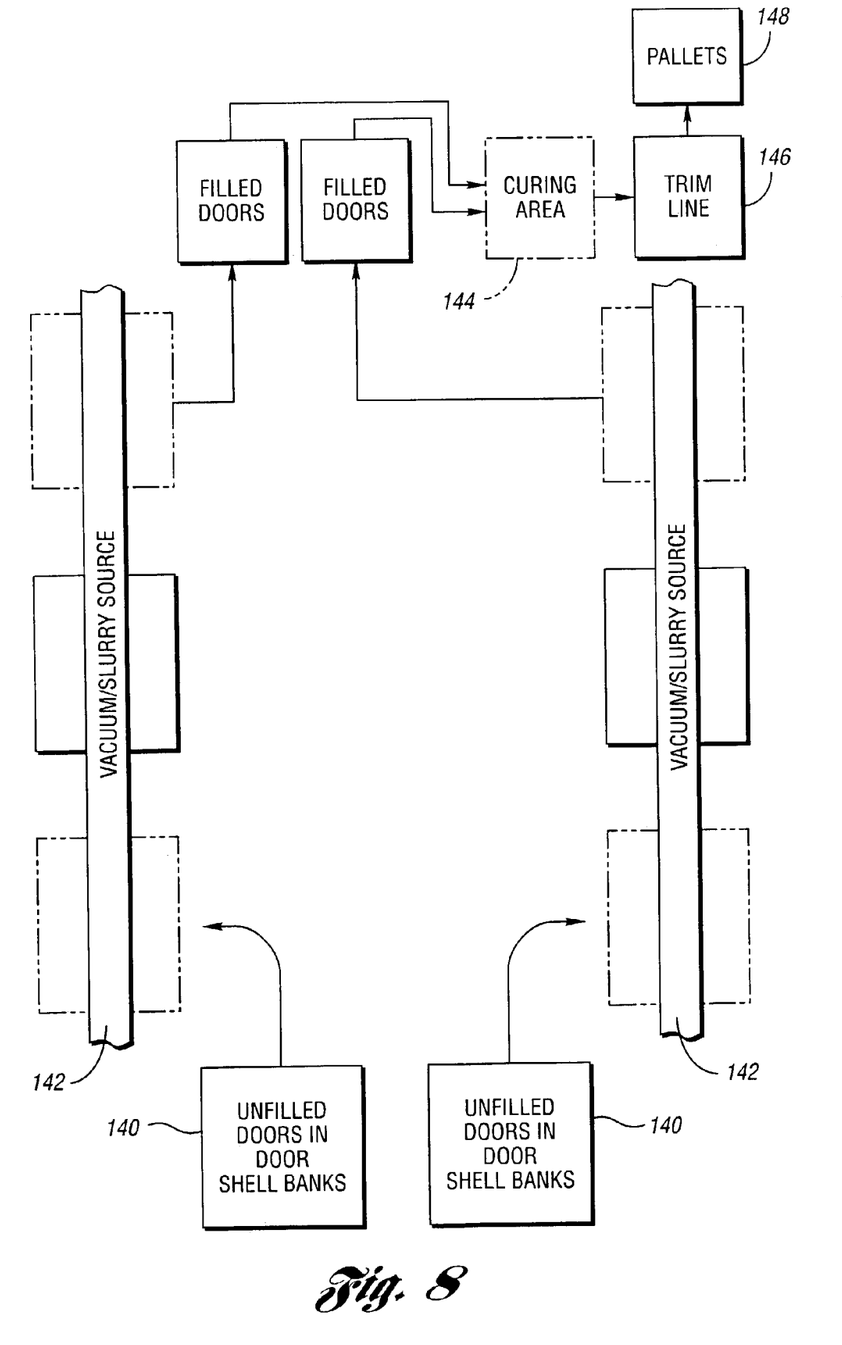
FIG. 8 depicts an overhead view of a schematic plant layout to be used in a system for producing doors in accordance with an embodiment of the present invention.

FIG. 8 depicts an overhead view of a schematic plant layout to be used in a system for producing doors in accordance with an embodiment of the present invention. In the depicted embodiment, the system can include a plurality of door shell banks 140 which are positioned below at least one platform 142 having a vacuum and slurry source for supplying a vacuum to reinforcement shells of door shell banks 140 and delivering the gas-cementitious material to the interior cavity of door shells, respectively. In certain embodiments, the filled doors can be moved on door shell banks 140 to a curing area 144, which can be a curing room, in order to green-strength cure the filled door shells. After curing, the doors can proceed to trim line 146 and pallets 148.

In certain embodiments, an adhesive can be applied to the interior surface of each door skin of each door before being loaded onto sled 104. The adhesive helps to adhere the foamed cement slurry to the interior surfaces during the curing process. Examples of suitable adhesives include, but are not limited to, latex adhesive, epoxy, hot melt urethane, radiation cured adhesives, and mixtures thereof. The adhesive can reduce the time necessary to achieve green-strength, i.e. when the door can be removed from the fixture without damage, for example, inducing cracking, and increases the strength of the door upon final setting. It should be understood that in certain embodiments the foamed cement slurry can reach this green-strength after at least partially curing the foamed cement slurry and without the use of an adhesive.

According to another embodiment of the present invention, a curable mixture is applied to the interior surface of at least one door skin and the interior surface of the door frame. The curable mixture cures to form a polymeric shell which can increase the security rating and/or the strength of the door. In certain embodiments, the curable mixture can be a viscous liquid when applied and dries upon curing to form a curable shell. The curable mixture can be applied to form the polymeric shell in a range of at least about 0.5 inches when dry to the full width of the interior door frame and within about 2.0 inches of the interior door frame corners to the full length of the interior door frame.

In certain embodiments, the curable mixture can be comprised of a curable resin, a co-curable monomer, a filler material, and a fibrous reinforcement material. Sufficient filler material can be added to prevent shrinkage of the curable shell. The amount of filler material necessary varies according to the amount of curable resin used in the curable mixture. In certain embodiments, the filler material can comprise between about 30% to about 80% by weight of the curable mixture. Unless otherwise stated, all percentages disclosed are by weight based on the total weight of the curable mixture. In other embodiments, about 50% to about 75% filler material can be used. In yet other embodiments, about 60% to about 74% filler material can be used. The fibrous reinforcement material can be selected from chopped fiberglass, woven fiberglass mat, nonwoven fiberglass mat, needled fiberglass mat, aramid fiber mat, carbon fiber mat, nylon screen, rubber-coated textiles, plastic laminated fibers, and combinations thereof. In certain embodiments, the fibrous reinforcement material can comprise about 10% to about 40% of the curable mixture. In other embodiments, the fibrous reinforcement material can comprise about 15% to about 35% of the curable mixture. In yet other embodiments, the fibrous reinforcement material can comprise about 17% to about 30% of the curable mixture.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for forming a rigid foamed cementitious core within a plurality of article shells comprising:
    a shell bank for retaining a plurality of article shells and comprising a sled, each article shell having a generally planar construction and a generally uniform thickness with marginal edges and having first and second article skins helping to define an interior cavity, the sled having a sled surface sized to support at least one marginal edge of each article shell, each article shell being placed spaced apart on the shell bank and being provided with a reinforcement;
    a filling station comprising a filling nozzle for delivering a gas-entrained cementitious material to the interior cavity of each article shell; and
    a pump for pumping the gas-entrained cementitious material through the filling nozzle and into the interior cavity of each article shell,
    whereby the gas-entrained cementitious material cures to form a rigid foamed cementitious core within each article shell in the plurality of article shells.

2. The apparatus of claim 1 wherein the reinforcement is comprised of a plurality of reinforcement shells having shell edges and shell surfaces, the sled surface being sized to support at least one shell edge of each reinforcement shell, each article shell and reinforcement shell being placed on the shell bank such that two reinforcement shells are adjacent to each article shell.

3. The apparatus of claim 2 wherein the reinforcement shells are comprised of fabricated metal.

4. The apparatus of claim 1 wherein the article shell is comprised of fabricated metal.

5. The apparatus of claim 4 wherein the reinforcement is comprised of the first and second door skins of each article shell.

6. The apparatus of claim 1 wherein the reinforcement is a plurality of metal reinforcement sheets of substantial thickness.

7. The apparatus of claim 1 wherein the plurality of article shells are comprised of a plurality of door shells.

8. An apparatus for forming a rigid foamed cementitious core within a plurality of article shells comprising:
    a shell bank for retaining a plurality of article shells and comprising a sled and a plurality of reinforcement shells having shell edges and shell surfaces, each article shell having a generally planar construction and a generally uniform thickness with marginal edges and having first and second article skins helping to define an interior cavity, the sled having a sled surface sized to support at least one marginal edge of each article shell and at least one shell edge of each reinforcement shell, each article shell and reinforcement shell being placed on the shell bank such that two reinforcement shells are adjacent to each article shell;
    a filling station comprising a filling nozzle for delivering a gas-entrained cementitious material to the interior cavity of each article shell;
    a pump for pumping the gas-entrained cementitious material through the filling nozzle and into the interior cavity of each article shell; and
    an at least one vacuum line for providing suction between at least one article skin and at least one reinforcement shell surface so that the at least one article shell retains its pre-curing during curing,
    whereby the gas-entrained cementitious material cures to form a rigid foamed cementitious core within each article shell in the plurality of article shells.

9. The apparatus of claim 8 wherein the plurality of article shells are comprised of a plurality of door shells and the first and second article skins are comprised of first and second door skins.

10. The apparatus of claim 9 wherein the marginal edges of each door shell are comprised of a first and second rail edge and a first and second stile edge, each rail edge having a length less than each stile edge.

11. The apparatus of claim 10 wherein the sled being sized to support the first rail edge and the second rail edge being detached from the door shell during the delivery of a gas-entrained cementitious material to the interior cavity of each door shell.

12. The apparatus of claim 10 wherein the sled being sized to support the first rail edge and the second rail edge having a pour hole sized to retain a portion of the filling nozzle during delivery of the gas-entrained cementitious material.

13. The apparatus of claim 10 wherein the first rail edge having a plurality of vent holes.

14. The apparatus of claim 8 wherein the pump is selected from the group consisting of a Moino pump and a disc pump.

15. The apparatus of claim 9 wherein the plurality of reinforcement shells include a first and second reinforcement shell ends and at least two platen shells, the first and second reinforcement shell ends being positioned on opposing ends of the sled, the at least two platen shells being placed between the first and second reinforcement shells and being spaced apart from each other and the first and second reinforcement shell ends to form at least two gaps for accommodating the generally uniform thickness of each door shell in the plurality of door shells.

16. The apparatus of claim 15 wherein each thickness of the first and second reinforcement shell ends is greater than the thickness of each platen shell.

17. The apparatus of claim 15 wherein the at least one vacuum line is attached to a shell edge of at least one platen shell.

18. The apparatus of claim 9 wherein the sled is comprised of a first and second sled panel.

19. The apparatus of claim 18 wherein a plurality of castors are attached to an at least one edge of the sled for facilitating movement of the sled around an assembly floor.

20. The apparatus of claim 17 wherein the filling station further includes a platform for aiding in the delivery of the gas-entrained cementitious material into the interior of each door shell.

21. The apparatus of claim 14 wherein each platen shell helps to define an interior platen cavity.

22. The apparatus of claim 21 wherein the interior platen cavity includes a tube for conveying a heat exchanging liquid and having a tube inlet for entering heat exchanging liquid and a tube outlet for exiting heat exchanging liquid.

23. The apparatus of claim 22 wherein the heat exchanging liquid is heated by a heater prior to entering the tube inlet.

24. The apparatus of claim 22 wherein the heat exchanging liquid is water.

25. The apparatus of claim 22 wherein the heat exchanging liquid exiting the tube outlet is circulated through the heater.

26. An apparatus for forming a rigid foamed cementitious core within a plurality of article shells comprising:
   a shell bank for retaining a plurality of article shells and comprising a sled and a plurality of spaced apart and reinforced open mouthed cavities having shell edges, each reinforced cavity suitable for housing and reinforcing at least one article shell, each article shell having a generally planar construction and a generally uniform thickness with marginal edges and first and second article skins helping to define an interior cavity, the sled having a sled surface sized to support at least one shell edge of each reinforcement shell, each reinforcement shell being placed spaced apart on the shell bank; and
   a filling station comprising a filling nozzle for delivering a gas-entrained cementitious material to the interior cavity of each article shell,
   a pump for pumping the gas-entrained cementitious material through the filling nozzle and into the interior cavity of each door shell,
   whereby the gas-entrained cementitious material cures to form a rigid foamed cementitious core within each article shell in the plurality of article shells.

27. The apparatus of claim 26 wherein the plurality of article shells are comprised of a plurality of door shells.

28. A system for producing an article with a rigid foamed cementitious core comprising:
   a plurality of apparatuses as described in claim 8;
   a platform for aiding in the delivery of the gas-entrained cementitious material into the interior cavity of each article shell; and
   a curing area for placement of the plurality of apparatuses after delivery of the gas-entrained cementitious material into the interior cavity of each article shell for at least partially curing the gas-entrained cementitious material to form a gas-entrained cementitious core.

29. The system of claim 28 further comprising a vacuum source for aiding in the delivery and curing of the gas-entrained cementitious material.

30. The system of claim 28 wherein the plurality of article shells are comprised of a plurality of door shells and the first and second article skins are comprised of first and second door skins.

31. The system of claim 30 further comprising a trim line for trimming each door shell after the forming of the gas-entrained cementitious core.

32. The system of claim 31 further comprising a plurality of pallets for loading trimmed doors.

33. The system of claim 32 wherein the curing area is comprised of a curing room.

34. A method for forming a door with a rigid foamed cementitious core comprising:
   providing the apparatus as described in claim 9,
   loading the plurality of door shells onto the sled;
   delivering the gas-entrained cementitious material into each door in the plurality of door shells;
   at least partially hydration curing the gas-entrained cementitious material to provide a rigid foamed cementitious core within the interior door cavity; and
   unloading each door shell from the sled,
   whereby the at least partially cured gas-entrained cementitious material provides a gas-entrained cementitious core for use in conjunction with a door.

35. The method of claim 34 further comprising disposing a web within the interior door cavity of each door shell prior to the delivery step.

36. The apparatus of claim 1 wherein the marginal edges includes one of the following sides extending between the first and second door skins: top side, bottom side, left side and right side.

37. The apparatus of claim 36 wherein the marginal edges include the bottom, left and right sides.

* * * * *